No. 865,411.
PATENTED SEPT. 10, 1907.
C. A. MARIEN.
CUSHION TIRE WHEEL.
APPLICATION FILED AUG. 27, 1906.
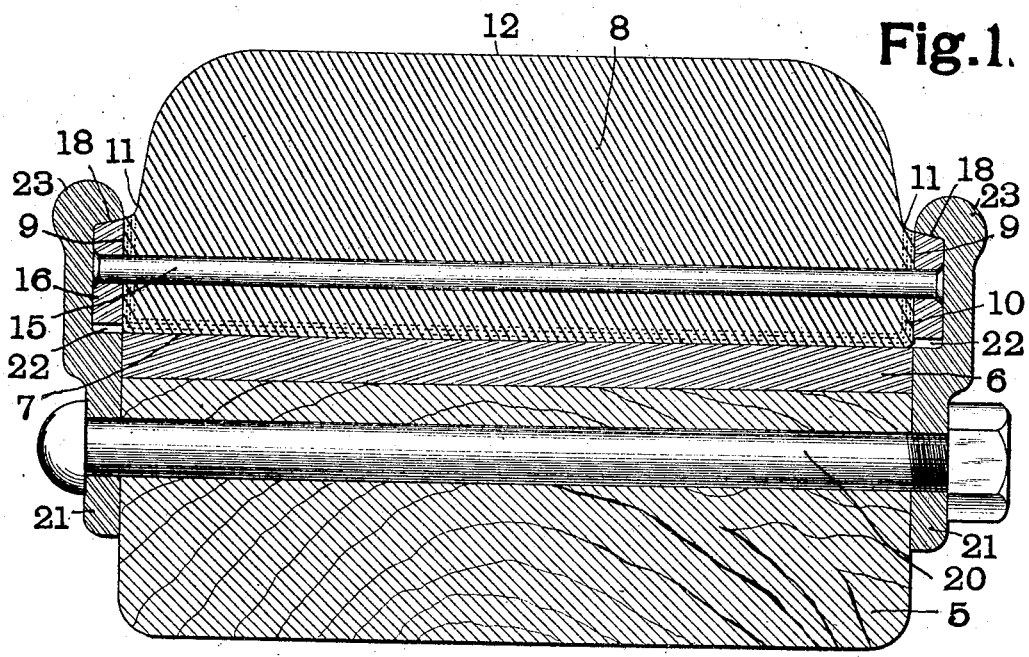
WITNESSES:
W. A. Alexander.
S. G. Stout.
INVENTOR
C. A. Marien.
BY
Fowler & Bryson
ATTORNEYS

UNITED STATES PATENT OFFICE.

CHARLES A. MARIEN, OF ST. LOUIS, MISSOURI.

CUSHION-TIRE WHEEL.

No. 865,411.　　　　　Specification of Letters Patent.　　　　　Patented Sept. 10, 1907.

Application filed August 27, 1906. Serial No. 332,125.

*To all whom it may concern:*

Be it known that I, CHARLES A. MARIEN, a citizen of the United States, residing at the city of St. Louis, in the State of Missouri, have invented a certain new and useful Cushion-Tire Wheel, of which the following is such a full, clear, and exact description as will enable any one skilled in the art to which it appertains to make and use the same, reference being had to the accompanying drawings, forming part of this specification.

My invention relates to cushion tires for wheels and more particularly to broad heavy tires such as are used on motor vehicles for heavy hauling. In such tires it has been usual heretofore to pass retaining bars laterally through the tire and secure said bars in position either by fastening wires around the projecting ends of the bars or securing to the said ends metallic rings which are embedded in grooves in the sides of the tire. In practice I have found that both of these forms of fastening the bars are objectionable. Both said forms tend to split the tire from the side towards the center; in one case by the formation of the grooves in the rubber, and in the other by the pressure of the wires against the sides of the tire. Furthermore, the small bearing contact between the cylindrical cross bars and the wires causes rapid wear so that the bars are allowed to move in a radial direction; and in the other form of fastening referred to, no provision is made for preventing such radial movement, that is, movement in the direction of the plane of the wheel.

The object of my invention is to provide fastening means for the cross bars which will overcome the above mentioned objections.

In the accompanying drawings which illustrate one form of tire made in accordance with my invention, Figure 1 is a cross section and Fig. 2 is a side view of a portion of the wheel, the retaining plate being partially broken away.

Like marks of reference refer to similar parts in both views of the drawings.

5 represents the wooden felly and 6 the metallic reinforcing band of an ordinary wheel rim. Seated on the band 6 is the base 7 of a cushion tire 8 of the usual form. From the base 7 the sides 9 of the tire extend in a perpendicular direction for a distance equal to nearly half the thickness of the tire. The base 7 and sides 9 are reinforced by a canvas strip 10 in the usual manner. The sides just beyond the vertical portion 9 are curved inwardly as shown at 11, from which point they are rounded to the flat tread 12. Fastened through the tire 8 at a short distance above the base 7 are the cross bars 15. These bars 15 are preferably cylindrical in form, as shown in the drawings, but they may be of any suitable form without departing from my invention. The projecting ends of the bars 15 pass through metallic rings 16 and are riveted as above shown at Fig. 1 so as to retain the rings 16 firmly in contact with the vertical sides 9 of the tire. Each of the rings 16 is split as indicated at 17 in Fig. 2, for purposes to be hereinafter described. The outer edges of the rings 16 are beveled, as shown at 18. Secured to each side of the rim by means of bolts 20 are annular retaining plates 21, in the inner face of each of which is formed a groove 22 adapted to receive one of the rings 16. The outer wheel of each of these grooves 22 is beveled to correspond with the bevel 18 on the outer edge of the rings 16, so that when the retaining plates 21 are drawn into position by means of the bolts 20 the rings 16 will be drawn towards the center of the wheel so as to firmly seat the base 7 of the tire against the rim. This is allowed by means of the split 17 in the rings hereinbefore referred to. The outer edges of the retaining plates 21 are rounded as shown at 23, so as to avoid injury to the tire should the tire come in contact with such edges.
The inward rounding of the tire at 11 hereinbefore referred to, however, prevents any contact between the tire and the rounded portion 23 under normal loads, and therefore there is practically no liability of the tire being caused to split from the sides toward the center.
In case the tire should become loose through excessive wear, the retaining plates 21 can be removed and replaced with new plates having grooves 22 of slightly less external diameter so that the tire would be again firmly drawn against the rim of the wheel.

Having fully described my invention, what I claim as new and desire to secure by Letters Patent of the United States, is—

1. The combination with the rim of a wheel, of a tire of resilient material seated on said rim, cross bars passing through said tire, annular members of rigid material engaging the ends of said bars, and retaining plates removably secured to said rim and locking said annular members against radial movement.

2. The combination with the rim of a wheel, of a tire of resilient material seated on said rim, cross bars passing through said tire, annular members of rigid material engaging the ends of said bars, and retaining plates removably secured to said rim and engaging the outer edges of said annular members.

3. The combination with the rim of a wheel, of a tire of resilient material seated on said rim, cross bars passing through said tire, annular members of rigid material engaging the ends of said bars and provided with beveled outer edges, and retaining plates removably secured to said rim and provided with beveled faces engaging with the beveled edges of said annular members.

4. The combination with the rim of a wheel, of a tire of resilient material seated on said rim and provided with vertical sides, cross bars passing through said tire, annular members of rigid material engaging the ends of said bars and bearing against the vertical sides of said tire, and retaining plates removably secured to said rim and provided with annular grooves receiving said annular members.

5. The combination with the rim of a wheel, of a tire of resilient material seated on said rim, cross bars passing through said tire, annular members of rigid material engaging the ends of said bars and provided with beveled outer edges, and retaining plates removably secured to said rim and provided with annular grooves receiving said annular members, the outer walls of said grooves being beveled to coöperate with the bevels on said annular members.

6. The combination with the rim of a wheel, of a tire of resilient material seated on said rim and provided with vertical sides, cross bars passing through said tire, annular members of rigid material engaging the ends of said bars and bearing against the vertical sides of said tire, the outer edges of said members being beveled, and retaining plates removably secured to said rim and provided with annular grooves receiving said annular members, the outer walls of said grooves being beveled to coöperate with the bevels on said annular members.

7. The combination with the rim of a wheel, of a tire of resilient material seated on said rim, cross bars passing through said tire, split metal rings engaging the ends of said bars, and means for drawing said rings toward the center of the wheel.

8. The combination with the rim of a wheel, of a tire of resilient material seated on said rim, cross bars passing through said tire, split metal rings engaging the ends of said bars and having their outer edges beveled, and retaining plates removably secured to said rim and provided with beveled faces coöperating with the bevels on said rings.

9. The combination with the rim of a wheel, of a tire of resilient material seated on said rim, cross bars passing through said tire, split metal rings engaging the ends of said bars and having their outer edges beveled, and retaining plates removably secured to said rim and provided with annular grooves receiving said rings, the outer walls of said grooves being beveled to coöperate with the bevels on said rings.

10. The combination with the rim of a wheel, of a tire of resilient material seated on said rim and of equal width therewith, cross bars passing through said tire, annular retaining plates secured to the sides of said rim and provided with annular recesses, and annular members of rigid material engaging the ends of said rods and seated in said recesses with their inner sides flush with the sides of said rim.

In testimony whereof, I have hereunto set my hand and affixed my seal in the presence of the two subscribing witnesses.

CHARLES A. MARIEN. [L. S.]

Witnesses:
JAMES W. GRAVES,
W. A. ALEXANDER.